Oct. 10, 1950   D. C. SPOONER, JR., ET AL   2,525,463
CONTROL FOR ELECTRIC BLANKETS AND THE LIKE
Filed Aug. 30, 1947   2 Sheets-Sheet 1
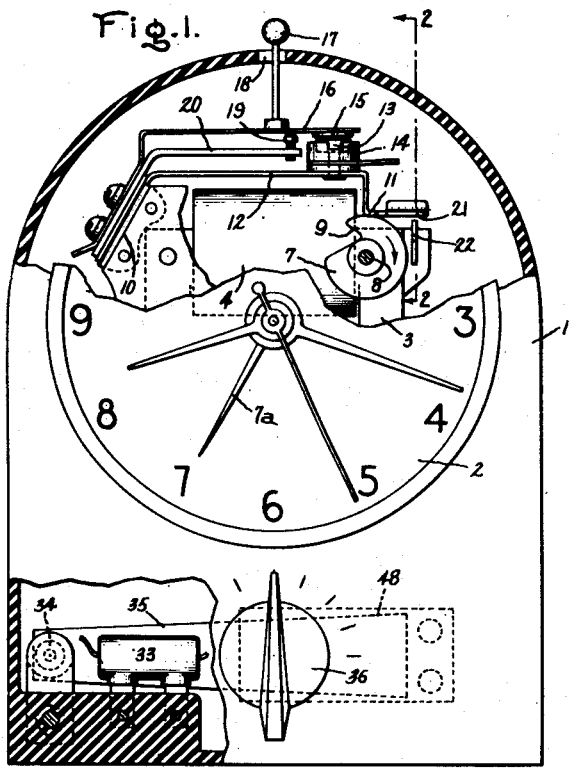
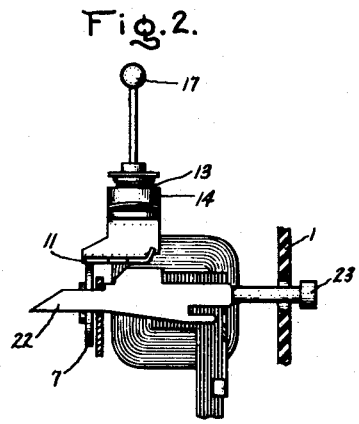
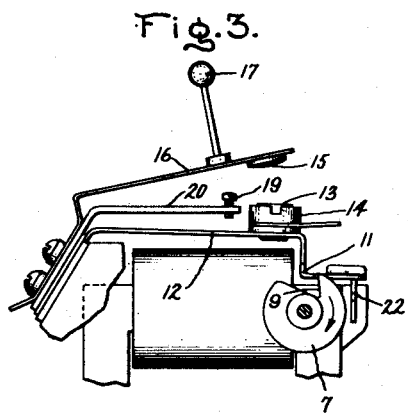
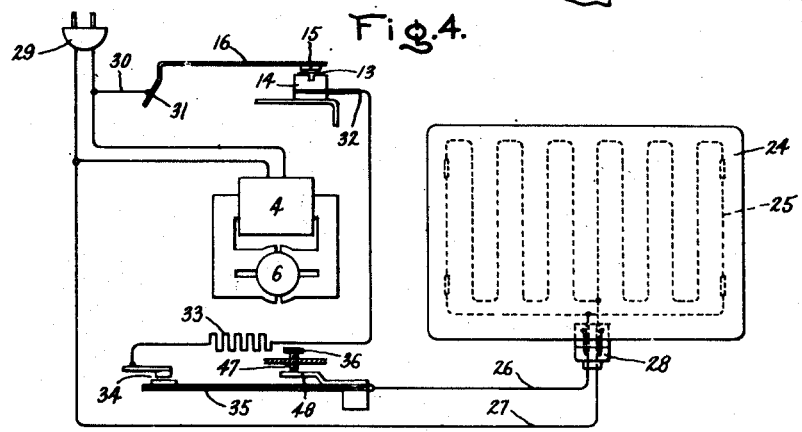
Inventors:
David C. Spooner, Jr.
George C. Crowley,
by Alfred E. Bobst
Their Attorney.

Oct. 10, 1950   D. C. SPOONER, JR., ET AL   2,525,463
CONTROL FOR ELECTRIC BLANKETS AND THE LIKE
Filed Aug. 30, 1947   2 Sheets—Sheet 2
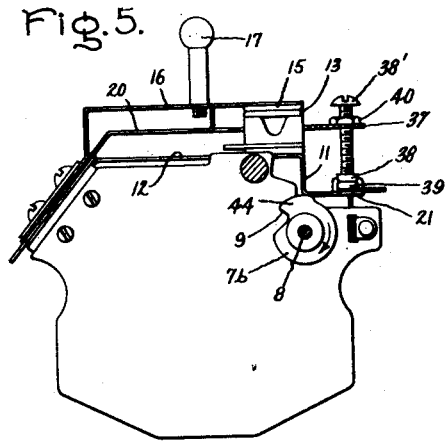
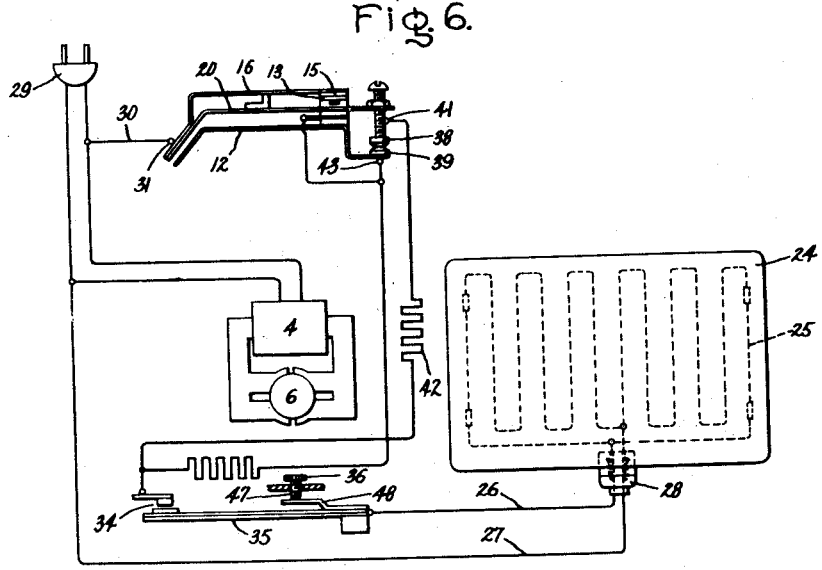
Inventors:
David C. Spooner, Jr.,
George C. Crowley,
by Alfred E. Bobst
Their Attorney.

Patented Oct. 10, 1950

2,525,463

UNITED STATES PATENT OFFICE 2,525,463

CONTROL FOR ELECTRIC BLANKETS AND THE LIKE

David C. Spooner, Jr., Stratford, and George C. Crowley, Bridgeport, Conn., assignors to General Electric Company, a corporation of New York Application August 30, 1947, Serial No. 771,454

4 Claims. (Cl. 161—23)

1

The present invention relates to a control for electrically heated blankets and the like.

It is an object of the present invention to provide an electric blanket control which will shut off the blanket heating current at a preselected time while otherwise providing the customary temperature regulation for the blanket.

A further object of the invention is to provide a combined alarm clock and electric blanket control whereby the blanket heating current will be shut off at a preset time and, if desired, simultaneously an alarm will ring.

A still further object of the present invention is to provide an electric blanket control which will automatically increase a preselected blanket temperature at some preselected time and will shut off the blanket heating current at a predetermined time thereafter.

The above and other objects of the invention, together with its construction and manner of operation, will best be understood from the following description taken in connection with the accompanying drawings in which Fig. 1 is an elevation, partially in section, of a control device in accordance with the invention; Fig. 2 is a partial section of a portion of the control mechanism taken along the line 2—2 in Fig. 1; Fig. 3 is an elevation of the control mechanism showing the control switch in open position; Fig. 4 is a schematic wiring diagram of the control as it may be connected to an electric blanket; Fig. 5 is an elevation of a modification of a portion of the control device, and Fig. 6 is a schematic circuit diagram incorporating the modification shown in Fig. 5.

As illustrated in the drawing, the invention includes a clock mechanism mounted in an insulating housing 1 and having a clock dial 2 and the customary hour, minute, and second hands for indicating the time. The clock mechanism within the housing may be a mechanical spring actuated clock, although it is preferably a synchronous electric motor driven clock. The latter is the form of clock mechanism shown in the illustrated embodiment of the invention. The mechanism includes an electromagnet 3 energized by magnet coil 4. Between the poles of the magnet is an armature, represented at 6 in Figure 4, which is connected through suitable gearing to drive the hands of the clock in a manner well-known in the art. Also geared to the motor is a cam 7 which is mounted on a shaft 8.

The cam 7 is provided with one or more discontinuities or steps in its surface, as for example the step 9 whose use will be described later.

2

Riding on the cam 7 is a cam follower 11 which may form part of an arm 12 supported by a bracket 10 on the clock motor frame. The arm 12 is preferably made of a spring material tensioned toward the cam 7. The position of the cam with respect to the cam follower at any given time as indicated by the hands of the clock can be varied by turning the cam shaft 8 by means of a suitable knob (not shown) projecting from the back of the housing 1 and preferably geared to an auxiliary pointer 7a on the face of the clock to indicate the relative time at which the cam follower 11 will drop into the step 9 in the cam surface.

The cam follower portion 11 of the arm 12 has an extension 21 of magnetic material positioned so that when the cam follower drops down the step 9 in the cam surface, the extension 21 will be close to a surface of electromagnet 3 where it will vibrate with a frequency determined by the magnet excitation current. Vibration of the element 21 can be prevented by means of a wedge 22 suitably mounted on the motor frame for longitudinal motion and operable from the rear of the housing 1 by means of the button 23. When the wedge is pushed in, as shown in Fig. 2, the element 21 cannot vibrate in any position of the cam 7. When, however, the wedge 22 is pulled out from under the element 21, the latter will be free to vibrate when the cam follower portion 11 drops off the step 9 in the cam surface.

Mounted in the arm 12 is a contact 13 which is preferably mounted on the face of a permanent magnet 14. A cooperating contact 15 is mounted on an arm 16 whose other end is likewise secured in the bracket 10. These contacts are connected into the blanket control circuit as will presently be explained. The arm 16, which is preferably of spring material, is tensioned away from the contact 13. A button 17 secured to the arm 16 is arranged to project through an aperture 18 in the housing 1. By pressing the button 17, the contact 15 can be moved downward until the arm 16 engages an adjustable stop 19 mounted on a fixed bracket 20 and held in position by the bracket 10. Stop 19 is adjusted so that when cam follower 11 is on one of the high surfaces of the cam 7, contacts 13 and 15 can just engage.

Figure 1 shows contacts 13 and 15 in closed position while Figure 3 shows them in open position. While the cam follower 11 is on the high part of the cam 7, the arm 12 carrying the contact 13 will be in a position shown in Figure 1. The button 17 can then be depressed, bringing the contact 15 into engagement with contact 13 where it will be held by the attraction of the magnet 14 for the magnetic material of the arm 16. When, however, the cam follower 11 drops off the step 9 of the cam, the contact 13 will move downward under the force of the spring tension of the arm 12 thereby separating the contacts and permitting the arm 16 to move upward into the position shown in Fig. 3. As cam 7 continues to revolve, the high part of the cam will again raise contact 13, although the contacts will remain open until button 17 is again depressed.

The wedge 22 controls the alarm, but has no restraining effect on the operation of the contacts 13, 15. This is because the wedge 22 is shaped and positioned so that the arm 12 can move downward a sufficient amount to open the contacts while still keeping the extension 21 at a sufficient distance from the magnet 3 to prevent vibration of the arm 12 and the sounding of an alarm. When, however, the button 23 is pulled out, withdrawing the wedge 22 from under extension 21, the usual alarm operation will be obtained simultaneously with the opening of contacts 13 and 15.

Contacts 13 and 15 are connected in the blanket heater supply circuit as shown, for example, in Fig. 4. A blanket or the like, diagrammatically represented at 24, has a heating wire 25 distributed over its surface in any desired manner. The heating wire 25 may be energized from the conductors 26 and 27 through a connection plug 28. A plug 29 is adapted to be connected to a source of electric power. One side of the plug 29 is directly connected to the conductor 27. The other side of the plug 29 is connected by conductor 30 to terminal 31 on the arm 16 and thus to contact 15. Contact 13 at terminal 32 is connected through a resistance heating element 33 to series contacts 34, the lower of which may be mounted on a bi-metal thermostatic element 35 positioned in proximity to the heater 33 and connected to conductor 26, thereby completing the power supply circuit to the blanket heating winding 25. The clock motor may have its energizing coil 4 directly connected to both terminals of the plug 29.

Thermostat 35, contacts 34 and thermostat heater 33 form a cycling on-off switch for the blanket heater current as described and claimed in United States Patent No. 2,195,958 issued April 12, 1940 to W. K. Kearsley and assigned to the same assignee as the present application. The thermostat 35 is mounted where it will be affected by the ambient temperature of the room in which the blanket 24 is being used, but will be unaffected by the blanket's temperature. The thermostat element may, therefore, be mounted within the housing 1 as indicated in Fig. 1. In the operation of this arrangement the contacts 34, which are normally closed at room temperatures, will be opened after the heater 33 produces sufficient heat to cause the bi-metal element 35 to deflect. The blanket current is thereby interrupted so that the heater 33 and bi-metal 35 cool down again to close contacts 34, whereupon the cycle is repeated. A given on-off cycle as just described will produce a substantially uniform temperature in the blanket 24 which will remain substantially the same regardless of changes in the room temperature.

The blanket temperature can, however, be adjusted by varying the initial position of the bi-metal 35 with respect to the stationary contact 34. For this purpose a knob 36 is mounted on the face of the housing 1. The knob 36 operates a screw 47 which bears against a member 48 secured to the bi-metal member 35. Thus by turning knob 36, the operator can vary the on-off cycle and the blanket operating temperature.

This temperature control system will, of course, only be operative when contacts 13 and 15 are closed. Thus, to start the blanket, the operator depresses button 17 closing contacts 13 and 15 whereupon the blanket heater winding 25 is supplied with heating current through the thermostat arrangement just described. The shut-off time of the blanket can be preset by the operator by setting the pointer 7a to the desired time, whereby the cam 7 is simultaneously rotated into a suitable position. The operation of the clock motor, which is preferably geared to turn the cam 7 one complete revolution in 12 hours, will thus cause the cam step 9 to rotate beneath the cam follower 11 at the selected time, whereupon the arm 12 will drop, opening contacts 13 and 15 and deenergizing the blanket heater winding 25. If the button 23 was pulled out by the operator, the element 21 will simultaneously vibrate to give an alarm.

It will be observed that the operator can shut off the blanket prior to the automatic cut-off time merely by pulling upward on the button 17, thereby manually opening contacts 13 and 15.

Fig. 5 shows a modification of the control switch mechanism. In this figure similar parts have been given the same reference numerals as in the preceding figures. The timing cam 7b is, however, provided with a second step 44 which is smaller than the main step 9 and in the opposite direction so that the cam follower 11 rises before dropping off the main step 9. In this modification, moreover, the fixed insulating arm 20 is provided with an extension 37 having a contact 38 adjustably mounted in its end. The adjustment may be effected by means of a screw 38' threaded into a nut 40 secured to the extension 37. Contact 38 makes connection with a contact 39 supported on the extension 21 of the contact follower 11 which forms part of the arm 12. The upper contact 38 is connected by terminal 41 to one side of a resistance 42, the other side of which is connected to the heater 33 at the point connecting with contacts 34. The resistance 42, when contacts 38 and 39 are closed, is connected in shunt with the heater 33, as shown in Fig. 6.

When the clock is initially set for blanket operation, contacts 13 and 15 are closed and contacts 38 and 39 are open. Since contacts 38 and 39 are open, resistance 42 is out of the circuit, and operation is the same as in the preceding modification. Later, a predetermined time before the time set by the indicator 7a, the cam 7 will have attained the position shown in Fig. 5. Now the cam follower 11 has just risen over the step 44, which rise is just sufficient to close contacts 38, 39 and thereby place resistance 42 in shunt with the thermostat heater 33. Since the heater 33 will thus receive a smaller current, it will take a longer time to cause the thermostat 35 to open contacts 34. The blanket will, therefore, reach a higher temperature. When the cam follower reaches step 9, the drop of the arm 12 will be sufficient to open contacts 13 and 15 and completely interrupt the blanket heating circuit. By this arrangement it is possible to provide a change in the calibration of the blanket temperature control circuit automatically at a predetermined time. This is particularly desirable in the early hours of the morning when the energy produced by the body of a sleeper is at an especially low level and a greater amount of blanket heat is required for comfort.

While we have shown and described particular embodiments of our invention, it will be obvious to those skilled in the art that various changes and modifications may be made without departing from our invention in its broader aspects and we, therefore, aim in the appended claims to cover all such changes and modifications as fall within the true spirit and scope of our invention.

What we claim as new and desire to secure by Letters Patent of the United States is:

1. A circuit control device comprising a clock motor, a cam driven by said motor and having a discontinuity in its surface, a cam follower biased against said cam, a pair of cooperating contacts adapted when closed to complete an electric circuit through them, one of said contacts being spring-tensioned away from the other of said contacts and said other contact being mounted on said cam follower, manually operable means movable for initially pressing said one contact into engagement with the other and for retracting said one contact from engagement with the other, and a permanent magnet carried by one of said contacts for holding said contacts in closed relation, said magnet being released for opening said contacts by said cam follower reaching the discontinuity in the cam surface and by manual retraction of said means.

2. A circuit control device comprising a clock motor, a cam driven by said motor and having a discontinuity in its surface, a first contact carrying arm having a cam follower positioned in operative relation to said cam and spring-tensioned toward the same, a second contact carrying arm having its contact positioned to cooperate with said first contact to close a circuit between them, said second arm being spring-tensioned away from said first arm, means mechanically connected to said second arm for manually moving said second arm into and out of contact closing relation with the first, permanent magnet means positioned on one of said arms in operative relation to the other for holding said contacts closed, and stop means positioned for engagement by both of said arms for limiting motion of said first arm in a direction away from said cam and of said second arm in a direction toward said cam, whereby said magnet holding means is effectively released for opening said contacts by actuation of the first arm by said manual moving means and by actuation of said second arm by said cam follower reaching said cam surface discontinuity.

3. A combined alarm clock and a circuit control device comprising an alarm clock mechanism including an electromagnet, a cam driven by said mechanism and having a discontinuity on its cam surface, a cam follower, a pair of cooperating contacts adapted when closed to complete an electric circuit through them, one of said contacts being spring-tensioned away from the other of said contacts and said other contact being mounted on said cam follower, manually operable means movable for pressing and retracting said one contact into and out of engagement with the other, a permanent magnet for holding said contacts in closed relation until released upon retraction of said manually operable means or by said cam follower reaching the discontinuity in the cam surface, and a magnetic armature on said cam follower movable into the field of said electromagnet to be vibrated thereby for giving an alarm simultaneously with the opening of said contacts when said cam follower reaches the discontinuity in the cam surface.

4. A combined alarm clock and circuit control device comprising an alarm clock mechanism including an electromagnet, a cam driven by said mechanism and having a discontinuity in its cam surface, a cam follower, a pair of cooperating contacts adapted when closed to complete an electric circuit through them, one of said contacts being spring-tensioned away from the other of said contacts and said other contact being mounted on said cam follower, manually operable means for initially pressing said one contact into engagement with the other and means for holding said contacts in closed relation until released by said cam follower reaching the discontinuity in the cam surface, a magnetic armature on said cam follower adapted when in the field of said electromagnet to be vibrated thereby for giving an alarm, and a cam member having three steps, said cam member being mounted for manual motion selectively into one of three cam follower restraining positions, said first step being such as to restrain said cam follower from following the discontinuity in said cam surface and thereby maintaining said contacts closed and said armature out of the field of said electromagnet, said second step being such as to permit said cam follower partially to follow the cam surface discontinuity and sufficiently to open said contacts while keeping said armature out of the field of said electromagnet and said third step being such as to permit said cam follower completely to follow said cam surface discontinuity thereby opening said contacts and bringing said armature within the field of said electromagnet to vibrate the armature as an alarm simultaneously with the opening of the contacts.

DAVID C. SPOONER, JR.
GEORGE C. CROWLEY.

REFERENCES CITED

The following references are of record in the file of this patent:

UNITED STATES PATENTS

| Number | Name | Date |
| --- | --- | --- |
| 615,388 | Hartdegen | Dec. 6, 1898 |
| 1,173,448 | McKnight | Feb. 29, 1916 |
| 1,690,898 | Hart | Nov. 6, 1928 |
| 1,798,854 | Satchwell | Mar. 31, 1931 |
| 1,821,629 | Gains | Sept. 1, 1931 |
| 1,831,605 | Porter | Nov. 10, 1931 |
| 1,864,487 | Flarsheim | June 21, 1932 |
| 1,895,060 | Urso | May 17, 1932 |
| 1,921,343 | Burkholder | Aug. 8, 1933 |
| 1,934,387 | Tweedale | Nov. 7, 1933 |
| 2,013,172 | Petrone | Sept. 3, 1935 |
| 2,027,531 | Hammond | Jan. 14, 1936 |
| 2,035,035 | Weeks | Mar. 24, 1936 |
| 2,344,820 | Kearsley | Mar. 21, 1944 |
| 2,403,803 | Kearsley | July 9, 1946 |
| 2,489,098 | Marble | Nov. 22, 1949 |